(12) United States Patent
Guido

(10) Patent No.: US 10,589,655 B2
(45) Date of Patent: Mar. 17, 2020

(54) LIFT CART ASSEMBLY

(71) Applicant: Dillon Guido, North Bay (CA)

(72) Inventor: Dillon Guido, North Bay (CA)

( * ) Notice: Subject to any disclaimer, the term of this patent is extended or adjusted under 35 U.S.C. 154(b) by 0 days.

(21) Appl. No.: 15/920,585

(22) Filed: Mar. 14, 2018

(65) Prior Publication Data
US 2019/0283647 A1    Sep. 19, 2019

(51) Int. Cl.
*B60P 1/64*    (2006.01)

(52) U.S. Cl.
CPC .................... *B60P 1/6427* (2013.01)

(58) Field of Classification Search
CPC ......... B60P 1/433; B60P 1/6427; B60P 3/064; B60P 3/062; B60P 3/06
See application file for complete search history.

(56) References Cited

U.S. PATENT DOCUMENTS

| | | | |
|---|---|---|---|
| 3,687,314 A | 8/1972 | Haugland | |
| 3,726,423 A * | 4/1973 | Miron | B60P 3/062 414/480 |
| 3,837,663 A | 9/1974 | Ness | |
| 5,232,329 A * | 8/1993 | Livingston | B60P 1/54 414/462 |
| 5,281,075 A * | 1/1994 | Tatman | B60P 3/08 414/480 |
| 5,380,141 A * | 1/1995 | Flowers | B60P 3/122 224/310 |
| 5,794,291 A * | 8/1998 | Olaussen | B60P 1/43 14/69.5 |
| 5,829,945 A * | 11/1998 | Stanley | B60P 1/003 414/477 |
| 5,899,466 A * | 5/1999 | Twaits, Jr. | B60P 3/062 280/47.18 |
| 5,934,863 A * | 8/1999 | Beck | B60P 1/433 144/344 |
| 6,099,232 A * | 8/2000 | Dixon | B60P 1/14 224/310 |
| 6,379,100 B2 * | 4/2002 | Schultz | B60P 3/062 296/35.3 |
| 6,698,994 B2 | 3/2004 | Barrett | |
| 6,767,171 B2 * | 7/2004 | Kelly | B60P 1/43 414/462 |
| 6,981,835 B1 * | 1/2006 | Groth | B60P 3/062 410/4 |
| 10,173,870 B1 * | 1/2019 | Hall | B66D 1/39 |
| 2001/0031193 A1 * | 10/2001 | Chevrier | B60P 3/062 414/522 |

(Continued)

*Primary Examiner* — Kaitlin S Joerger

(57) ABSTRACT

A lift cart assembly for loading an off road vehicle into the bed of a pickup includes a lift that is positionable in a first position having the lift angling downwardly from a tailgate of a pickup. Thus, an off road vehicle may be driven onto the lift. The lift is positionable in a second position having the lift being horizontally oriented on the tailgate to lift the off-road vehicle upwardly from the ground. The lift is urged above into a third position having the being positioned in a bed of the pickup. In this way the lift positions the off-road vehicle in the bed of the pickup. A plurality of rollers is provided and each of the rollers is rotatably coupled to the lift. Each of the rollers rolls along the bed of the pickup for positioning the lift between the first position, the second position and the third position.

9 Claims, 5 Drawing Sheets

(56) References Cited

U.S. PATENT DOCUMENTS

| | | | |
|---|---|---|---|
| 2002/0136621 A1* | 9/2002 | Scherle | B60P 1/433 414/480 |
| 2004/0009055 A1* | 1/2004 | Scherle | B60P 1/433 414/537 |
| 2005/0111945 A1* | 5/2005 | Miller | B60P 3/06 414/500 |
| 2007/0059133 A1* | 3/2007 | Kim | B60P 1/003 414/462 |
| 2007/0092363 A1* | 4/2007 | Morfitt | B60P 1/433 414/467 |
| 2008/0246295 A1* | 10/2008 | Bejin | B60P 1/003 296/61 |
| 2010/0266378 A1* | 10/2010 | Verwys | B60P 1/433 414/537 |
| 2013/0223972 A1* | 8/2013 | Eng | B60P 1/43 414/812 |

* cited by examiner

LIFT CART ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to lift devices and more particularly pertains to a new lift device for loading an off road vehicle into a bed of a pickup.

(2) Description of Related Art Including Information Disclosed Under 37 CFR 1.97 and 1.98

The prior art relates to lift devices.

BRIEF SUMMARY OF THE INVENTION

An embodiment of the disclosure meets the needs presented above by generally comprising a lift that is positionable in a first position having the lift angling downwardly from a tailgate of a pickup. Thus, an off road vehicle may be driven onto the lift. The lift is positionable in a second position having the lift being horizontally oriented on the tailgate to lift the off-road vehicle upwardly from the ground. The lift is urged above into a third position having the being positioned in a bed of the pickup. In this way the lift positions the off-road vehicle in the bed of the pickup. A plurality of rollers is provided and each of the rollers is rotatably coupled to the lift. Each of the rollers rolls along the bed of the pickup for positioning the lift between the first position, the second position and the third position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
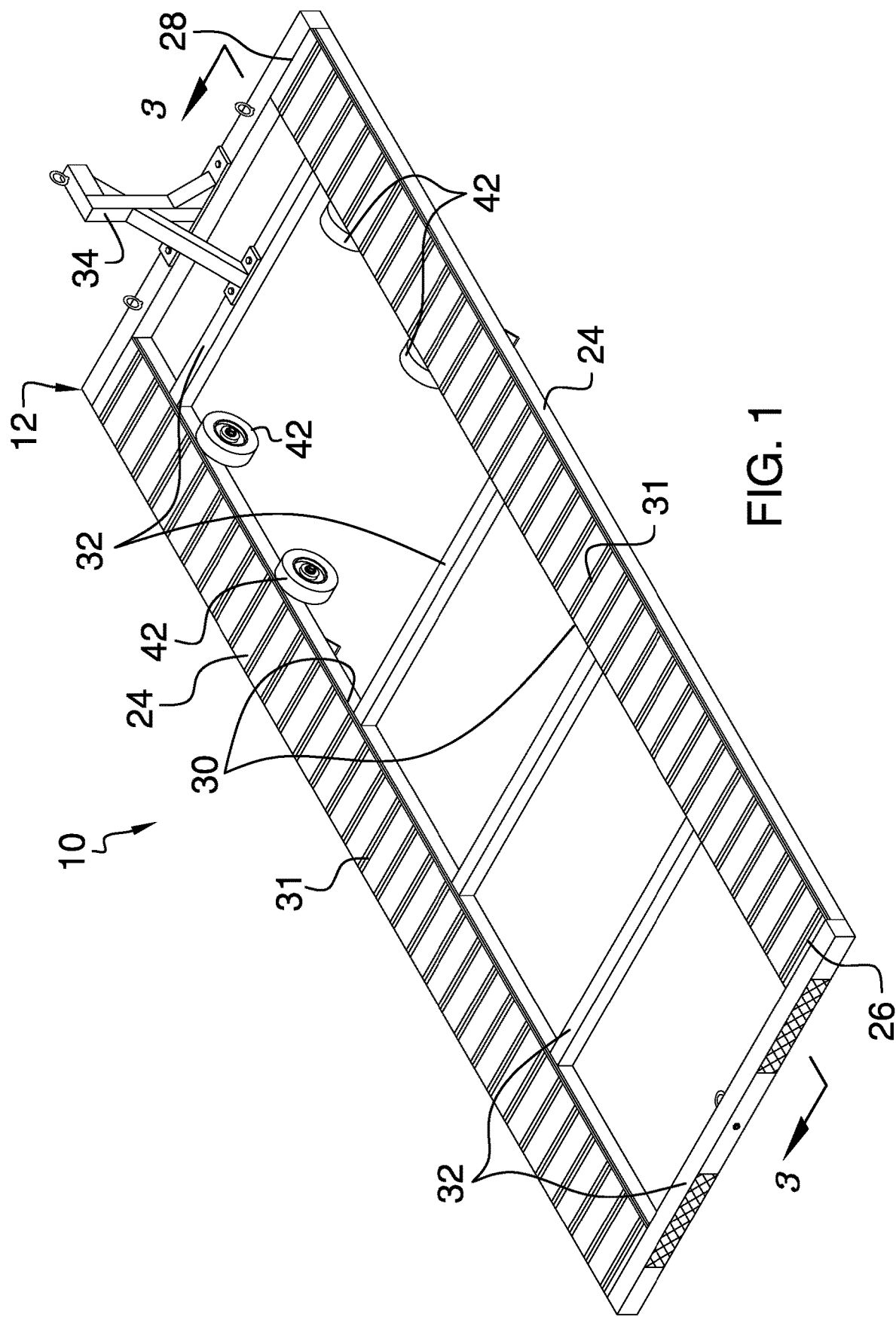
FIG. 1 is a top perspective view of a lift cart assembly according to an embodiment of the disclosure.
Figure 2:
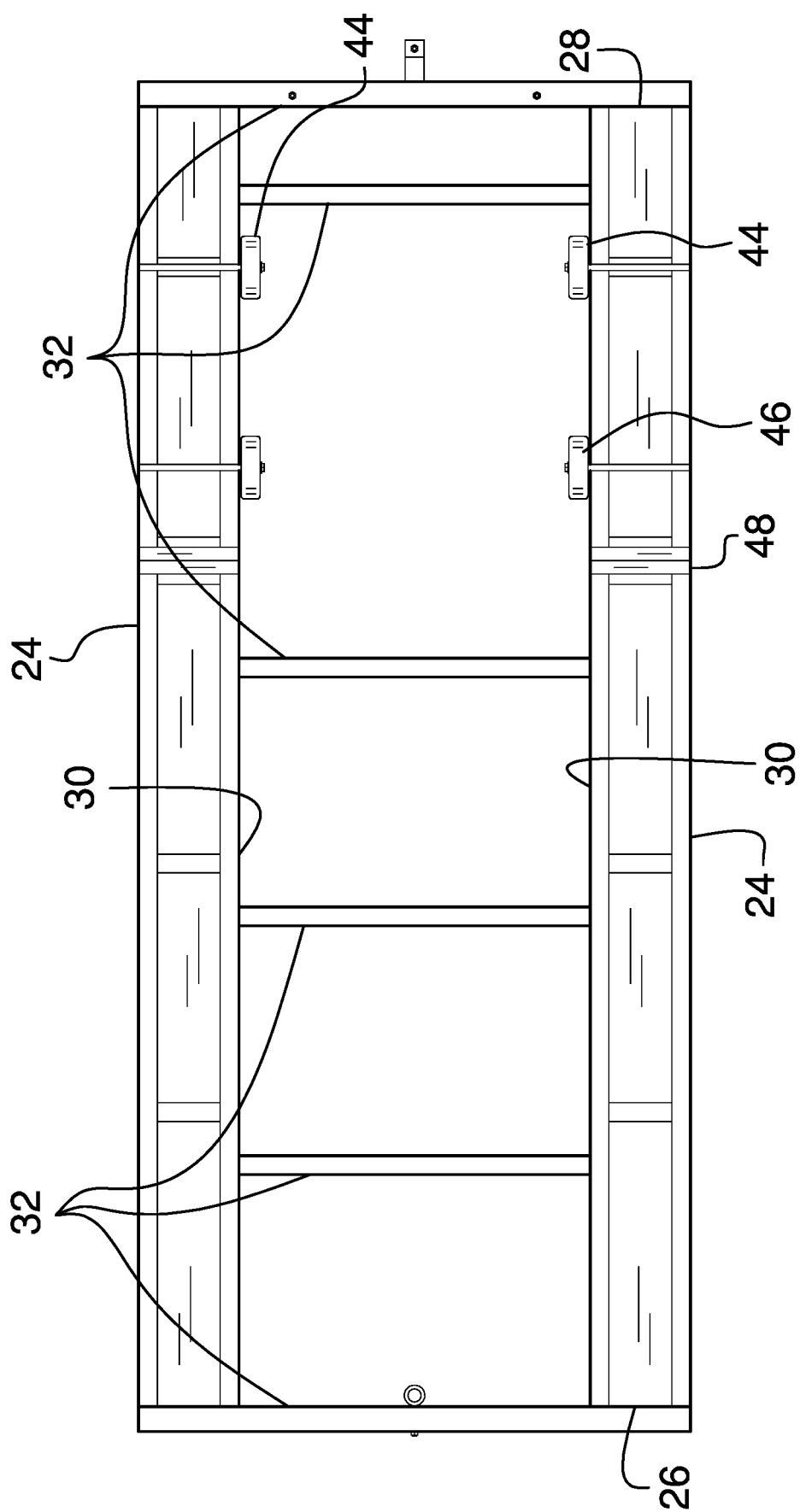
FIG. 2 is a bottom view of an embodiment of the disclosure.
Figure 3:
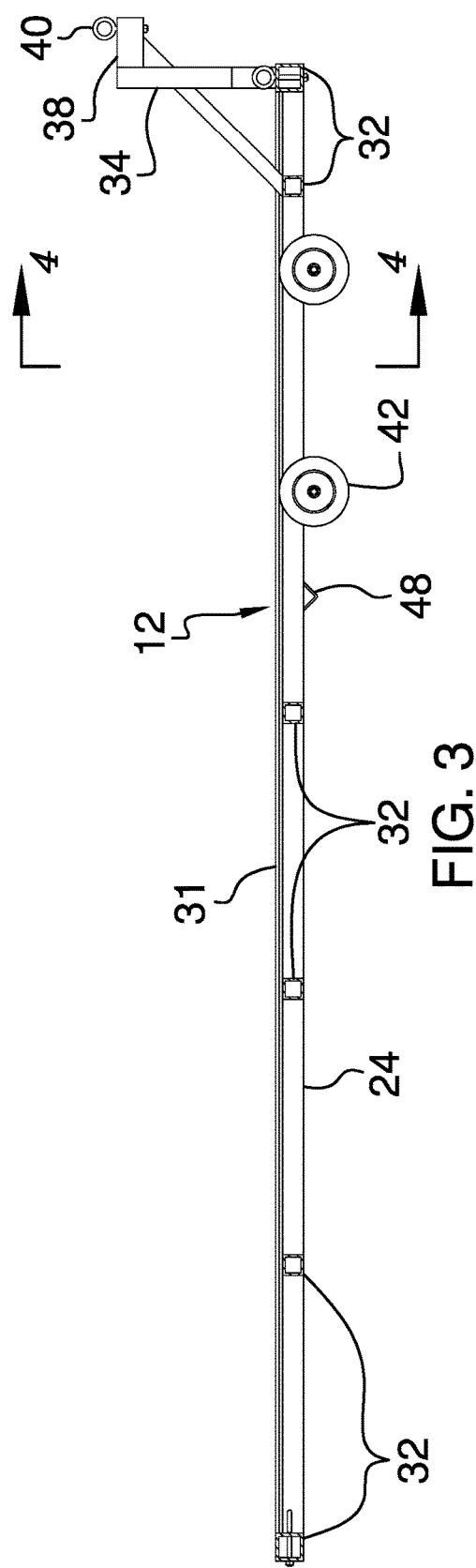
FIG. 3 is a cross sectional view taken along line 3-3 of FIG. 1 of an embodiment of the disclosure.
Figure 4:
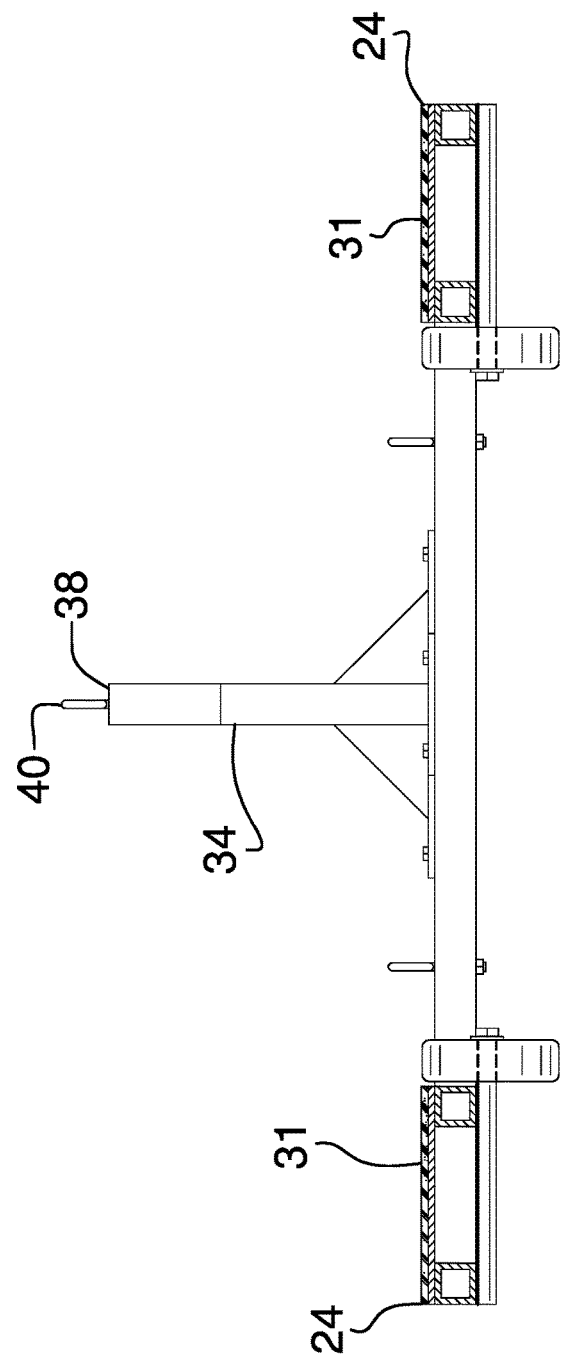
FIG. 4 is a cross sectional view taken along line 4-4 of FIG. 3 of an embodiment of the disclosure.
Figure 5:
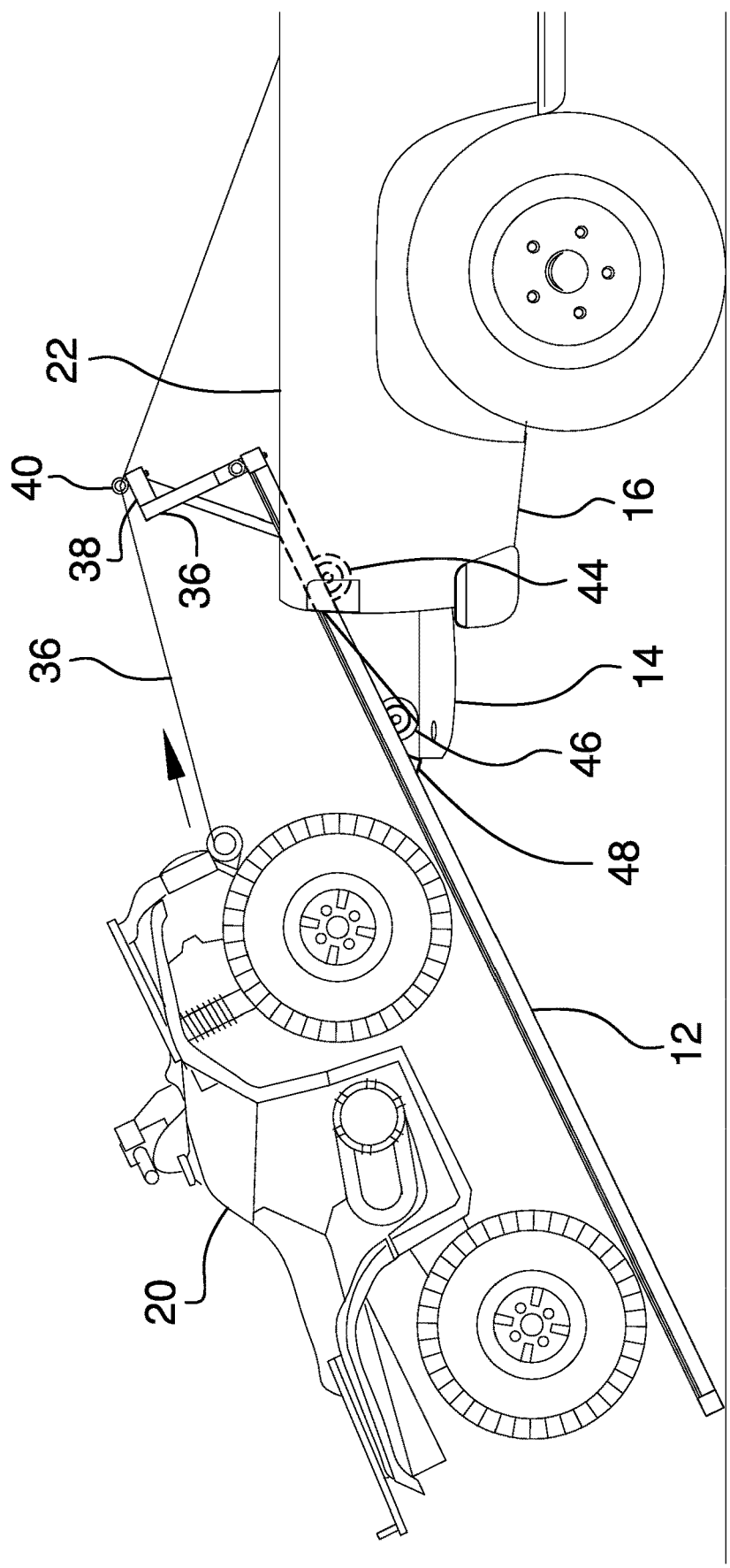
FIG. 5 is a perspective in-use view of an embodiment of the disclosure showing an off road vehicle being loaded.
Figure 6:
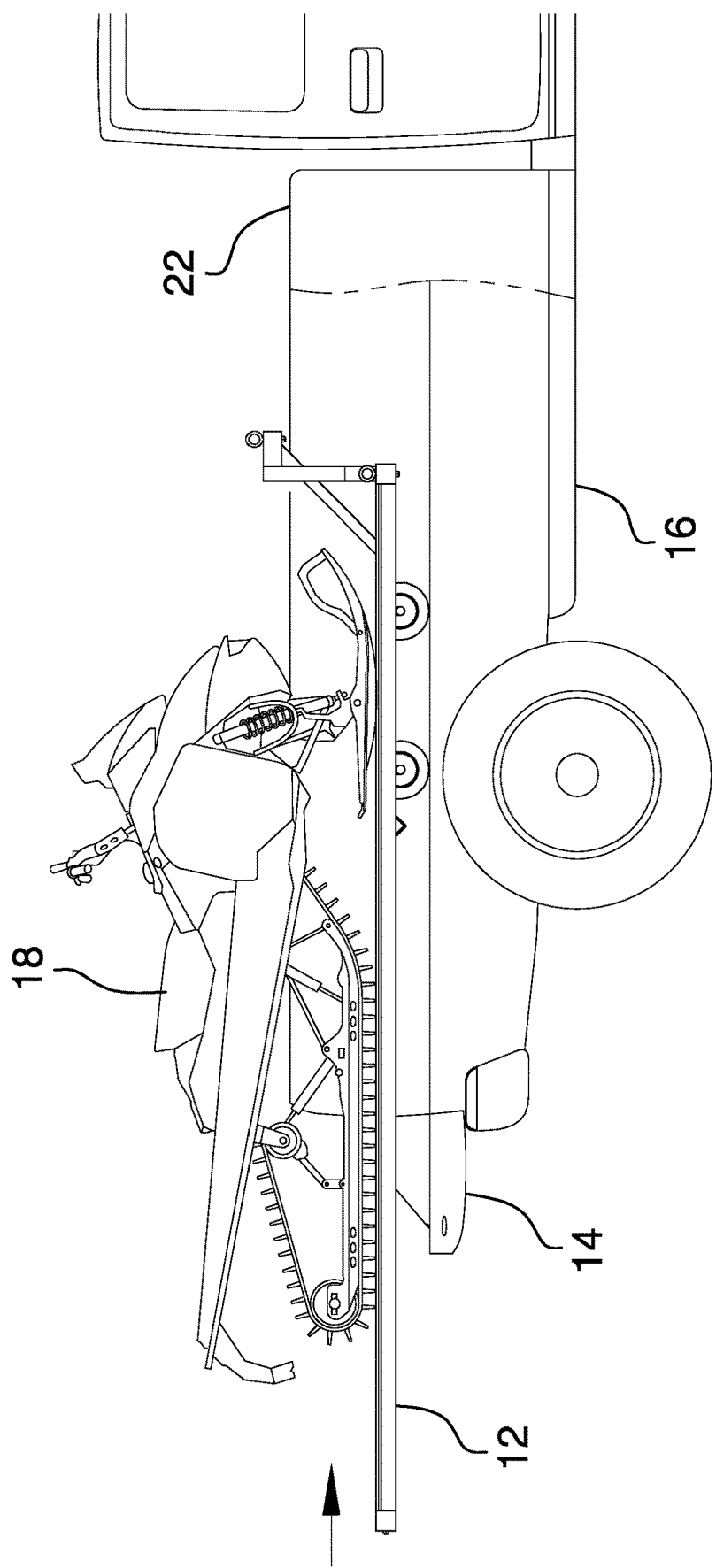
FIG. 6 is a perspective in-use view of an embodiment of the disclosure showing a snowmobile being loaded.

With reference now to the drawings, and in particular to FIGS. 1 through 6 thereof, a new lift device embodying the principles and concepts of an embodiment of the disclosure and generally designated by the reference numeral 10 will be described.

As best illustrated in FIGS. 1 through 6, the lift cart assembly 10 generally comprises a lift 12 that is positionable in a first position having the lift 12 angling downwardly from a tailgate 14 of a pickup 16. Thus, a snowmobile 18 or an off road vehicle 20 such as a four wheeled ATV or the like, may be driven onto the lift 12. The lift 12 is positionable in a second position having the lift 12 being horizontally oriented on the tailgate 14 to lift the snowmobile 18 or off-road vehicle 20 upwardly from the ground. Additionally, the lift 12 is urged into a third position having the lift 12 being positioned in a bed 22 of the pickup 16 thereby positioning the snowmobile 18 or off-road vehicle 20 in the bed 22 of the pickup 16.

The lift 12 comprises a pair of ramps 24 that each has a first end 26, a second end 28 and a first lateral edge 30 extending therebetween. Each of the ramps 24 angles downwardly from the tailgate 14 of the pickup 16 when the lift 12 is positioned in the first position having the first end 26 corresponding to each of the ramps 24 abutting ground. Thus, the ramps 24 are positioned to have the snowmobile 18 or off-road vehicle 20 drive thereon. The first end 26 corresponding to each of the ramps 24 is lifted upwardly thereby horizontally orienting the ramps 24 on the tailgate 14 of the pickup 16 when the lift 12 is positioned in the second position. Additionally, each of the ramps 24 is urged forwardly to lie in the bed 22 of the pickup 16 when the lift 12 is positioned in the third position. In this way the snowmobile 18 or off-road vehicle 20 is transferred between the ground and the bed 22 of the pickup 16. Each of the ramps 24 has a top side 31 and the top side 31 corresponding to each of the ramps 24 is textured to enhance traction.

A plurality of supports 32 is provided and each of the supports 32 is coupled between each of the ramps 24 having the ramps 24 being spaced apart from each other. The supports 32 are spaced apart from each other and are distributed between the first end 26 and the second end 28 of the ramp. Moreover, the supports 32 are distributed along the first lateral edge 30 corresponding to each of the ramps 24.

An upright 34 is coupled to and extends upwardly from one of the supports 32 that is aligned with the second end 28 of the ramps 24. The upright 34 is centrally positioned between the ramps 24 and the upright 34 may include a gusset, an angled support and any other means of retaining the upright 34 in a vertical orientation. A winch line 36 from the off-road vehicle 20 may be extended through the upright 34 when the lift 12 is positioned in the first position. In this way the winch line 36 may draw the off-road vehicle 20 upwardly onto the ramps 24 without compromising the vertical orientation of the upright 34. The upright 34 has a distal end 38 with respect to the support 32 that the upright 34 is positioned on. A guide 40, such as a pulley, an eyelet or other type of cable guide, is positioned on the distal end 38 to inhibit the winch line 36 from frictionally engaging the upright 34.

A plurality of rollers 42 is provided and each of the rollers 42 is rotatably coupled to the lift 12 to roll along the bed 22 of the pickup 16. In this way the lift 12 is positioned between the first position, the second position and the third position. Each of the rollers 42 is positioned on the first lateral edge 30 of an associated one of the ramps 24 and the plurality of rollers 42 includes a pair of first rollers 44 and a pair of second rollers 46. The first rollers 44 are positioned between the second end 28 of the ramps 24 and the second rollers 46.

The second rollers 46 abut the tailgate 14 when the lift 12 is positioned in the first position to inhibit the lift 12 from sliding downwardly off of the tailgate 14. Moreover, each of the second rollers 46 acts as a fulcrum when the snowmobile 18 or off-road vehicle 20 is fully driven on to the lift 12. Thus, the first end 26 corresponding to each of the ramps 24 may be lifted upwardly from the ground thereby facilitating the lift 12 to be urged into the second position. The first end 26 corresponding to each of the ramps 24 is subsequently urged into the bed 22 to move the lift 12 into the third position. Each of the first rollers 44 and each of the second rollers 46 roll along the bed 22 when the lift 12 is urged into the third position.

In use, the lift 12 is positioned in the first position and the snowmobile 18 is fully driven onto the ramps 24 such that the snowmobile's 18 engine is positioned above the fulcrum defined by the second rollers 46. The parking brake on the snowmobile 18 is engaged and the first end 26 corresponding to each of the ramps 24 is urged upwardly from the ground. The weight of the snowmobile's 18 engine facilitates a single person to urge the lift 12 into the second position when the snowmobile 18 is parked on the lift 12. Each of the first rollers 44 and the second rollers 46 roll along the bed 22 when the lift 12 is urged into the third position. In this way the snowmobile 18 is loaded into the bed 22 of a pickup 16.

The lift 12 is positioned in the first position and the off road vehicle 20 is partially driven onto the ramps 24. The winch line 36 is extended through the guide 40 on the upright 34 and the winch line 36 is attached to a front end of the bed 22. The winch on the off road vehicle 20 is turned on, subsequently urging the off road vehicle 20 upwardly onto the lift 12. A stop 48 is coupled to a bottom side of the ramps 24 and the stop 48 engages the tailgate 14 when the lift 12 is in the first position. In this way the lift 12 is inhibited from sliding upwardly on the tailgate 14 when the winch line 36 draws the off road vehicle 20 upwardly on the ramps 24. Additionally, the winch line 36 urges the lift 12 into the second position when the off road vehicle 20 abuts the upright 34. In this way the off road vehicle 20 is fully rolled onto the lift 12 and the lift 12 is urged into the second position. Additionally, the stop 48 is lifted upwardly from the tailgate 14 when the lift 12 is urged into the second position. The lift 12 may be urged into the third position with the winch line 36 or the lift 12 may be manually urged into the third position once the winch line 36 has positioned the lift 12 and the off road vehicle 20 in the second position. In this way the off road vehicle 20 is loaded into the bed 22 of a pickup 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A lift cart assembly being configured to roll and off road vehicle into a bed of a pickup, said assembly comprising:
 a lift being positionable in a first position having said lift angling downwardly from a tailgate of a pickup wherein said lift is configured to have an off road vehicle driven thereon, said lift being positionable in a second position having said lift being horizontally oriented on the tailgate wherein said lift is configured to lift the off-road vehicle upwardly from the ground, said lift being urged above into a third position having said lift being positioned in a bed of the pickup wherein said lift is configured to position the off-road vehicle in the bed of the pickup, said lift including a pair of ramps, each of said ramps having a first end, a second end and a first lateral edge extending therebetween, each of said ramps angling downwardly from the tailgate of the pickup when said lift is positioned in said first position having said first end corresponding to each of said ramps abutting ground wherein each of said ramps is configured to have the off-road vehicle drive thereon; and
 a plurality of rollers, each of said rollers being rotatably coupled to said lift wherein each of said rollers is configured to roll along the bed of the pickup for positioning said lift between said first position, said second position and said third position, each of said rollers being positioned on said first lateral edge of an associated one of said ramps, said plurality of rollers including a pair of first rollers and a pair of second rollers, said first rollers being positioned between said second end of said ramps and said second rollers.

2. The assembly according to claim 1, wherein each of said ramps is horizontally oriented on the tailgate of the pickup when said lift is positioned in said second position.

3. The assembly according to claim 2, wherein each of said ramps lies in the bed of the pickup when said lift is positioned in said third position.

4. The assembly according to claim 1, further comprising a plurality of supports, each of said supports being coupled between each of said ramps having said ramps being spaced apart from each other, said plurality of supports being spaced apart from each other and being distributed between said first end and said second end along said first lateral edge corresponding to each of said ramps.

5. The assembly according to claim 4, further comprising an upright being coupled to and extending upwardly from one of said supports being aligned with said second end of said ramps, said upright being centrally positioned between said ramps wherein said upright is configured to have a winch line from the off-road vehicle extended therethrough when said lift is positioned in said first position thereby facilitating the winch line to draw the off-road vehicle upwardly onto said ramps.

6. The assembly according to claim 1, wherein said second rollers abut the tailgate when said lift is positioned in said first position wherein said second rollers are configured to inhibit said lift from sliding downwardly off of the tailgate.

7. The assembly according to claim 6, wherein each of said second rollers acts as a fulcrum when the off-road vehicle is fully driven on to said lift thereby facilitating said lift to be urged into said second position.

8. The assembly according to claim 7, wherein each of said first rollers and each of said second rollers rolls along the bed when said lift is urged into said third position.

9. A lift cart assembly being configured to roll and off road vehicle into a bed of a pickup, said assembly comprising:
    a lift being positionable in a first position having said lift angling downwardly from a tailgate of a pickup wherein said lift is configures to have an off road vehicle driven thereon, said lift being positionable in a second position having said lift being horizontally oriented on the tailgate wherein said lift is configured to lift the off-road vehicle upwardly from the ground, said lift being urged into a third position having said lift being positioned in a bed of the pickup wherein said lift is configured to position the off-road vehicle in the bed of the pickup, said lift comprising:
        a pair of ramps, each of said ramps having a first end, a second end and a first lateral edge extending therebetween, each of said ramps angling downwardly from the tailgate of the pickup when said lift is positioned in said first position having said first end corresponding to each of said ramps abutting ground wherein each of said ramps is configured to have the off-road vehicle drive thereon, each of said ramps being horizontally oriented on the tailgate of the pickup when said lift is positioned in said second position, each of said ramps lying in the bed of the pickup when said lift is positioned in said third position;
        a plurality of supports, each of said supports being coupled between each of said ramps having said ramps being spaced apart from each other, said plurality of supports being spaced apart from each other and being distributed between said first end and said second end along said first lateral edge corresponding to each of said ramps; and
        an upright being coupled to and extending upwardly from one of said supports being aligned with said second end of said ramps, said upright being centrally positioned between said ramps wherein said upright is configured to have a winch line from the off-road vehicle extended therethrough when said lift is positioned in said first position thereby facilitating the winch line to draw the off-road vehicle upwardly onto said ramps; and
        a plurality of rollers, each of said rollers being rotatably coupled to said lift wherein each of said rollers is configured to roll along the bed of the pickup for positioning said lift between said first position, said second position and said third position, each of said rollers being positioned on said first lateral edge of an associated one of said ramps, said plurality of rollers including a pair of first rollers and a pair of second rollers, said first rollers being positioned between said second end of said ramps and said second rollers, said second rollers abutting the tailgate when said lift is positioned in said first position wherein said second rollers are configured to inhibit said lift from sliding downwardly off of the tailgate, each of said second rollers acting as a fulcrum when the off-road vehicle is fully driven on to said lift thereby facilitating said lift to be urged into said second position, each of said first rollers and each of said second rollers rolling along the bed when said lift is urged into said third position.

* * * * *